(12) United States Patent
Bussard et al.

(10) Patent No.: US 8,621,210 B2
(45) Date of Patent: Dec. 31, 2013

(54) AD-HOC TRUST ESTABLISHMENT USING VISUAL VERIFICATION

(75) Inventors: Laurent Bussard, Aachen (DE); Ulrich Müller, Aachen (DE); Alain Gefflaut, Aachen (DE)

(73) Assignee: Microsoft Corporation, Redmond, WA (US)

( * ) Notice: Subject to any disclaimer, the term of this patent is extended or adjusted under 35 U.S.C. 154(b) by 856 days.

(21) Appl. No.: 12/146,774

(22) Filed: Jun. 26, 2008

(65) Prior Publication Data

US 2010/0017602 A1 Jan. 21, 2010

(51) Int. Cl.
*H04L 9/00* (2006.01)
*H04L 9/08* (2006.01)
*G06F 17/30* (2006.01)
*G06F 7/04* (2006.01)
*G06F 15/16* (2006.01)

(52) U.S. Cl.
USPC .................. 713/168; 726/6; 380/44; 380/278

(58) Field of Classification Search
USPC .................. 713/168, 161, 170; 726/3, 20
See application file for complete search history.

(56) References Cited

U.S. PATENT DOCUMENTS

| | | | |
|---|---|---|---|
| 5,499,294 A | 3/1996 | Friedman | |
| 6,912,657 B2 | 6/2005 | Gehrmann | |
| 7,036,014 B2 | 4/2006 | Bellare et al. | |
| 7,243,231 B2 * | 7/2007 | Ellison et al. | 713/168 |
| 7,577,250 B2 * | 8/2009 | Damgaard et al. | 380/44 |
| 7,848,746 B2 * | 12/2010 | Juels | 455/424 |
| 7,930,554 B2 * | 4/2011 | Coulier et al. | 713/184 |
| 2004/0230843 A1 * | 11/2004 | Jansen | 713/202 |
| 2005/0044395 A1 | 2/2005 | Staring et al. | |
| 2006/0020812 A1 * | 1/2006 | Steinberg et al. | 713/181 |
| 2006/0090073 A1 * | 4/2006 | Steinberg et al. | 713/170 |
| 2007/0147610 A1 | 6/2007 | Reddy | |
| 2007/0168332 A1 | 7/2007 | Bussard et al. | |

OTHER PUBLICATIONS

Jansen, W. 2004. Authenticating Mobile Device Users through Image Selection. In The Internet Society: Advances in Learning, Commerce and Security, K. Morgan & M. J. Spector (Editors), v30, p. 10. [retrieved from the internet on Jan. 31, 2011].*

(Continued)

*Primary Examiner* — Saleh Najjar
*Assistant Examiner* — Feliciano Mejia
(74) *Attorney, Agent, or Firm* — Zete Law, P.L.L.C.; MacLane C. Key

(57) ABSTRACT

Methods for ad-hoc trust establishment using visual verification are described. In a first embodiment, a visual representation of a shared data is generated on two or more devices and the visual representations generated can be visually compared by a user. This method can be used to verify that the correct devices are involved in a negotiation, when pre-existing trust relationships do not exist between the devices. The visual representation may, for example, comprise a picture with a number of different elements, each representing a part of the shared data. In another embodiment, a method of secure key exchange is described in which, before sharing the keys, the parties exchange information which encapsulates the key. This information can be used subsequently to check that a party has not changed the key that they are using and prevents a man in the middle attack.

13 Claims, 7 Drawing Sheets

(56) References Cited

OTHER PUBLICATIONS

Du, W., Wang, R., Ning, P., "An efficient scheme for authenticating public keys in sensor networks" MobiHoc '05 Proceedings of the 6th ACM international symposium on Mobile ad hoc networking and computing ACM New York, NY, USA © 2005 pp. 58-67. [retrieved from ACM database on Jan. 31, 2011].*

Adrian Perrig, Dawn Song, "Hash Visualization: a New Technique to improve Real-World Security (1999)". In International Workshop on Cryptographic Techniques and E-Commerce, 131-138 [retrieved from CiteSeer database "http://citeseer.ist.psu.edu/viewdoc/summary?doi=10.1.1.41.1574" on May 2, 2012].*

"Diffie-Hellman Key Exchange", retrieved Apr. 29, 2008 at <<http://en.wikipedia.org/wiki/Diffie-Hellman_key_exchange>>, Wikipedia, pp. 1-5.

Ellison, et al, "Public-Key Support for Group Collaboration", retrieved at <<http://delivery.acm.org/10.1145/960000/950195/p547-ellison.pdf?key1=950195&key2=0117058021&coll=GUIDE&dl=GUIDE&CFID=64367677&CFTOKEN=56291938>>, ACM Transactions on Information and System Security, vol. 6, No. 4, Nov. 2003, pp. 547-565.

Ford, et al, "Persistent Personal Names for Globally Connected Mobile Devices", retrieved at <<pdos.csail.mit.edu/papers/uia:osdi06.pdf>>, Massachusetts Institute of Technology, pp. 1-16, 1999.

Ginesu, et al, "Mutual Image-Based Authentication Framework with JPEG2000 in Wireless Environment", retrieved at <<http://hindawi.com/GetPDF.aspx?doi=10.1155/WCN/2006/73685>>, Hindawi Publishing Corporation, vol. 2006, Article ID 73685, pp. 1-14.

Goffee, et al, "Greenpass: Decentralized, PKI-based Authorization for Wireless LANs", retrieved at <<http://www.cs.dartmouth.edu/~sws/pubs/greenpass04.pdf>>, 3rd Annual PKI Research and Development Workshop Proceedings, 2004, pp. 1-16.

Perrig, et al, "Hash Visualization: a New Technique to Improve Real-World Security", retrieved at <<http://sparrow.ece.cmu.edu/~adrian/projects/validation/validation.pdf>>, Computer Science Department, Carnegie Mellon University, pp. 1-8, 2006.

Siegemund, et al, "Towards Pervasive Connectivity in Mobile Computing Settings", retrieved at <<http://delivery.acm.org/10.1145/1170000/1169080/a5-siegemund.pdf?key1=1169080&key2=6035948021&coll=GUIDE&dl=GUIDE&CFID=64350702&CFTOKEN=76408328, ACM, 2006, pp. 1-6.

"The TIPPI Point: Toward Trustworthy Interfaces", retrieved at <<http://www.cs.dartmouth.edu/~sws/pubs/ss05a.pdf>>, IEEE, 2005, pp. 68-71.

* cited by examiner

AD-HOC TRUST ESTABLISHMENT USING VISUAL VERIFICATION

BACKGROUND

Encryption techniques have been developed to enable secure data exchange over an insecure communication channel. Internet Protocol (IP) is an example of an insecure communication channel. These encryption techniques use one or more keys to provide the security. One example of a cryptographic protocol is the Diffie-Hellman key agreement protocol in which data is exchanged between two parties in order to generate a shared secret key known by only the two parties. Such a symmetric key can then be used to secure the communications between the two parties over an insecure communication channel. While Diffie-Hellman enables a secret key to be securely created over an insecure channel, the protocol does not provide any authentication of the communicating parties.

An example of an authentication technique uses public key cryptography which is an asymmetric technique and where each party owns a private secret key and the associated public key. Such a technique usually relies on a public key infrastructure (PKI) where at least one of the parties has a public key that is signed by a trusted entity, such as a certification authority (CA). The authentication of parties is based on the fact that both parties trust the CA of the PKI. In effect, the PKI creates a trust relationship between two parties that try to communicate and hence can be used to enable the authentication of the parties.

The embodiments described below are not limited to implementations which solve any or all of the disadvantages of known encryption techniques.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods for ad-hoc trust establishment using visual verification are described. In a first embodiment, a visual representation of a shared data is generated on two or more devices and the visual representations generated can be visually compared by a user. This method can be used to verify that the correct devices are involved in a negotiation, when pre-existing trust relationships do not exist between the devices. The visual representation may, for example, comprise a picture with a number of different elements, each representing a part of the shared data. In another embodiment, a method of secure key exchange is described in which, before sharing the keys, the parties exchange information which encapsulates the key. This information can be used subsequently to check that a party has not changed the key that they are using and prevents a man in the middle attack.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Traditional authentication methods rely on the use of a public key infrastructure (PKI) where trusted entities called certificate authorities (CA) are used to sign public keys. In such a model, CAs represent a form of pre-existing trust relationship between nodes. However, there are situations where such techniques are not suitable. For example, in the case where users want to create a secure ad-hoc peer to peer connection, a public key signed by a trusted CA is unlikely to be available or because of the ad-hoc nature of the connection creation, there may be times when the CA itself, or access to the CA, is not available. Additionally, use of a key signed by a trusted CA does not necessarily assist a user in identifying a person who is standing next to them. Indeed, the identity or other attributes certified by the CA are unlikely to be meaningful for another party in an ad hoc setting.

In an example scenario two users, Alice and Bob, want to securely share information using a local network, such as a local Wi-Fi network. Using their devices and a discovery protocol, each user can see and access the other user's device; however, for any data sharing to be secure they need to be sure that they have identified the other user's device correctly and that they have not selected another user's device, for example, by mistake or because of an attack or an impersonation by a third device.

The following discussion refers to parties or users and these terms are used interchangeably. It will be appreciated that the methods described may be used in a variety of different situations, e.g. between two or more people, between a person and a machine (e.g. a self-service terminal) etc. Where the parties/users are people, a user device will be used to perform aspects of the methods described herein and method steps may be performed automatically or may require user input.

Figure 1:
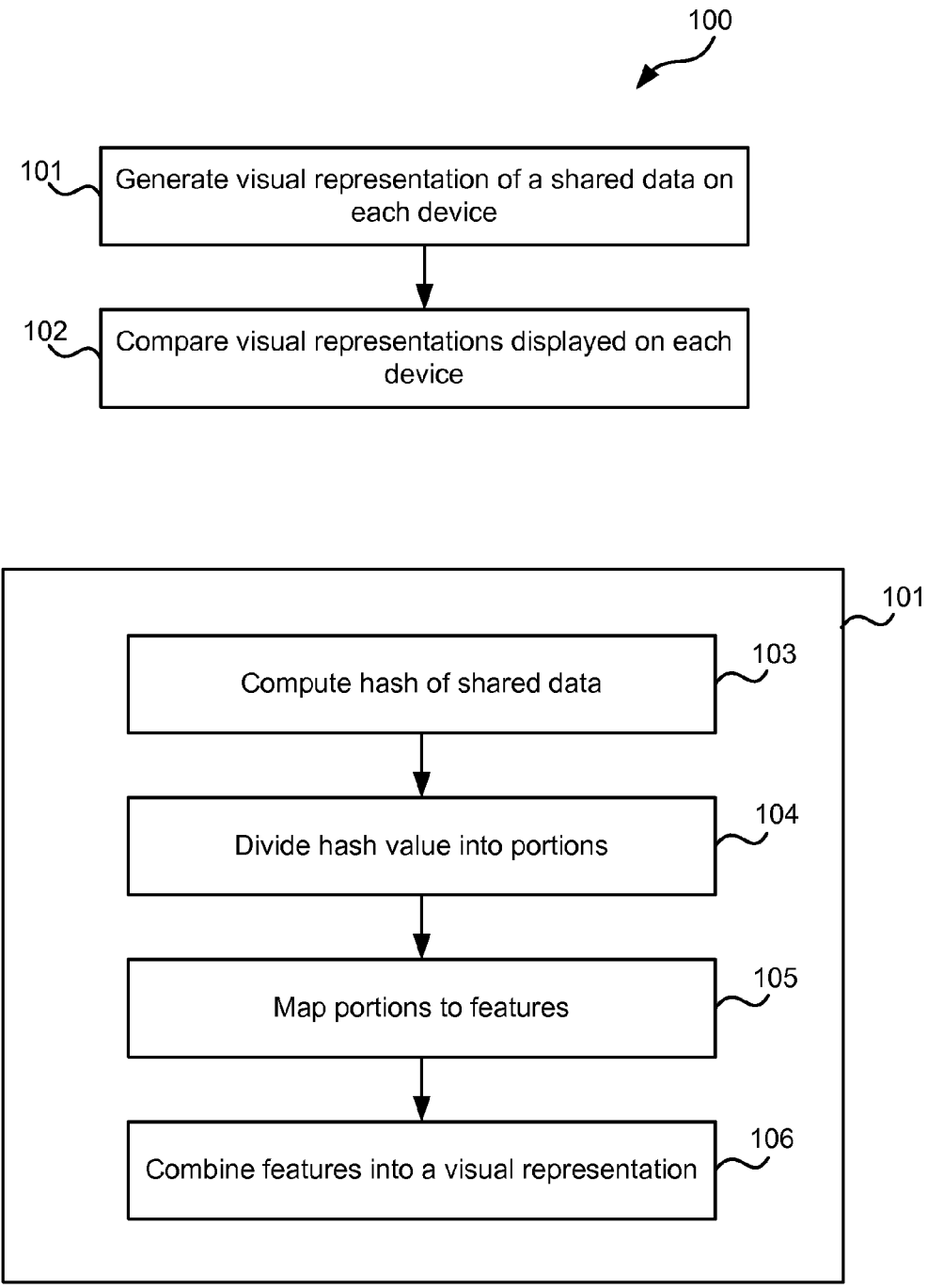
FIG. 1 comprises a flow diagram of an example method of verifying shared data and an example flow diagram of one of the method steps in more detail.

FIG. 1 comprises a flow diagram 100 of an example method of verifying shared data and an example flow diagram of one of the method steps in more detail. This method could be used in the scenario described above to enable Alice and Bob to confirm that they are communicating with each other and not with another party that is spoofing the communication between them—an attack known as a 'man in the middle' attack. Any method of creating shared data may be used and various examples are described below. The shared data may, in some examples, be a shared secret. In a simple example, a first user may send their public key to a second user. In addition, the second user may also send their public key to the first user. On each device, the two public keys may be combined by each party and a visual representation of the public keys may be generated and used as shown in FIG. 1 to verify that the devices are really talking to each other. Although the above example involves public keys, in other examples, other data elements may be shared. Furthermore, whilst in the example, data is exchanged between users, in other examples the data may be provided by only one party and a visual representation of the data generated by each party.

The shared data (which may be a shared secret) is verified by generating a visual representation of the shared data on each device (block 101) and relying on humans to perform the comparison, e.g. Alice generates a visual representation of the shared data using her mobile computing device (e.g. a mobile telephone, PDA, laptop computer etc) and Bob generates a visual representation of the shared data using his mobile computing device (which may be of the same or different type to Alice's device). The visual representations are then displayed on each device and compared (block 102). This comparison (in block 102) is performed by one or both of the users (e.g. by Alice and/or Bob) and may be done when the users are together, e.g. by holding the two devices next to each other and comparing the visual representations, or when the users are remote, e.g. with one user describing the visual representation displayed on their device to a second user who compares the description to the visual representation displayed on their device. In other examples, the visual representations may be communicated to each other electronically or transmitted to another device (e.g. a web server) such that they can be compared in another manner (e.g. by being displayed side by side on one of the user's devices or on a web page etc).

Use of a visual representation, as described above, enables users to make a fast and accurate comparison of the shared data which is displayed on each device (or otherwise). This is because the human eye is capable of quickly comparing symmetry and patterns and if the visual representation is such that a change in input value (i.e. a change in the shared data from which it is generated) causes an obvious change in the picture, the verification can be performed very quickly (e.g. in a fraction of a second).

The visual representation of the shared data (also referred to as a 'visual hash') may comprise a graphical representation of a hash value of the shared data and in such an example, the visual representation may be generated (in block 101) as shown in the bottom half of FIG. 1. A hash of the shared data is computed (block 103), for example using a standard hash function such as MD5 or SHA1. The hash value is then divided into portions (block 104) and each portion is mapped to a graphical feature (block 105). Any type of graphical feature may be used, such as a representation of an object, a background/foreground color, a number of objects, an outer shape etc. The graphical features are then combined to form the visual representation of the shared data (block 106). The size of the hash may be different from the size of the original shared data and to limit the complexity of the visual representation, the hash will in many examples have a smaller size than the original shared data. The visual hash will in many examples have a smaller size than the hash value to avoid over complex images. As the visual hash is created (in block 101) from a mapping of a cryptographic hash function, the shared data cannot be derived from the visual hash.

The portions into which the hash value is divided (in block 104) may be of equal sizes or may be of different sizes. In a first example, the hash value may be divided such that the first $n_1$ bits are in the first portion, the next $n_2$ bits are in the second portion etc. In other examples, the hash value may be divided in a different way. Furthermore, whilst in some examples each portion of the hash may be mapped to a graphical feature (in block 105), in other examples only a subset of the portions may be mapped to graphical features.

In an example, the features may be selected from a dictionary of features which may comprise a dictionary of images. For example, a fixed set of:

256 unique graphical symbols (e.g. animals, trees, houses, cars, people) that are easy to differentiate; and 8 background colors.

Figure 2:
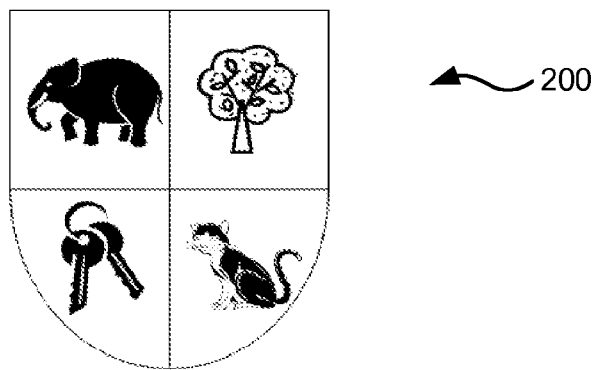
FIG. 2 shows a black and white example of a visual representation of shared data.

The graphical symbols may be used to represent 8 bits of the hash value and the background colors may be used to represent 3 bits of the hash value (e.g. where the hash value has 11 bits, $n_1=8$ and $n_2=3$). This leads to a representation of 11 bits in a single picture (which comprises an object and a background color). Furthermore, multiple pictures may be combined to form a larger picture, e.g. four smaller pictures making up one picture, encoding 44 bits in a single picture. In such an example, a 44 bit hash value may be divided into 8 portions (e.g. $n_1=8$, $n_2=3$, $n_3=8$, $n_4=3$, $n_5=8$, $n_6=3$, $n_7=8$ and $n_8=3$). FIG. 2 shows a black and white example of such a picture which comprises four smaller pictures (each comprising an object) and which embeds 32 bits (8 bits for each of the four objects).

Whilst the graphical symbols used need not be selected from a standardized dictionary (or library), use of such a dictionary makes the comparison quicker and easier, particularly where the comparison is performed visually by holding two devices side by side, with each device displaying a visual representation. Where the comparison is performed verbally, the comparison may be performed quickly as long as there is one common word used to describe each graphical symbols (e.g. 'cat') even though the two dictionaries used may have different images of cats. Confusion may, however, occur where there are two images which may be similarly described (e.g. 'leopard' and 'cheetah' which may both be described as 'cats with spots') and dictionaries may be selected (and in some examples standardized) to avoid these situations. In an example a dictionary of clip-art elements may be used. Performing the comparison verbally is, however, likely to be slower than performing a visual comparison.

Given the simplicity of the visual representation, the comparison of the two visual representations need not be done by viewing the two representations simultaneously. In one example, a user may view a first visual representation on one device and then may subsequently (e.g. 5 seconds later) view a second visual representation on the other device.

Through use of a visual representation, as described herein, the methods described are language independent and the same protocols, dictionaries etc may be used independently of the native language of the parties.

Although in the above example method of generating a visual representation (block 101), the visual representation is generated from a computed hash value (as computed in block 103), in other examples, the visual representation may be generated from the shared data directly (e.g. by dividing the shared data into portions, mapping each portion (or a subset of the portions) to a feature and combining the features into a visual representation). Use of a hash value, however, may reduce the overall number of bits that need to be encoded within the visual representation and also prevents derivation of the shared data from the visual representation (as described above).

The security of a visual hash (or other visual representation of shared data) depends on the number of encoded bits. The number of bits which are required to be encoded within a visual hash therefore depends on the particular scenario and the required security level. The longer the visual hash value, the lower the probability that two different keys get mapped to the same value, thus the higher the security level. However, comparing long values is difficult and more error-prone, and although this is made easier through use of a visual representation, it is still difficult to compare two generated pictures containing lots of visual information. However, human comparison of complex generated pictures has the interesting property that an attacker cannot know what part of the picture will be looked at closely and therefore a user may notice a small difference even in a very complex visual representation.

Thus, the size of the hash value may be selected by considering the opportunity for an attacker to compromise the scheme by generating another set of keys that map to the same hash value. The opportunity for an attacker may depend upon the protocol which is used by parties to generate the shared data (and examples of protocols are described below) and upon the lifetime of the shared data. Where the shared data has a long lifetime (e.g. long-term credentials such as a public key), the length of the visual hash needs to be larger because an attacker has a longer period of time to attempt to determine a key which has the right visual hash value. The number of bits which may be used and embedded in the visual representation can strongly vary depending on the scheme and example values are given below:

Interactive scheme (i.e. where users are interacting, as in the Bob and Alice example above): 64 bits or less Non-interactive schemes with short lifetime and no collision attacks: 64-128 bits Non-interactive scheme with long-term credentials (e.g. an X.509 certificate or a user's own public key): more than 128 bits, e.g. 160, 256, or more.

Whilst the above description refers to use of a dictionary of features (for use in the mapping in block 105) which comprises graphical symbols and/or colors, in other examples the features may comprise other elements. In a first example, the features may comprise words (or other strings of characters), such that the visual representation is a collection of words (or strings). In another example, the features may comprise sound clips (e.g. short extracts of music or different notes/tones) such that the resultant representation is not a visual representation but an audible representation. Where an audible representation is used, the two representations may be compared by listening to them sequentially or by listening to them at the same time (e.g. where a difference between the two representations would be noticeable where the sound comprises two superimposed different sounds rather than a single sound).

The following description describes different protocols for ad-hoc trust establishment. These protocols may be used to generate shared data which may then be converted into a visual representation and verified, as described above. Alternatively, these protocols may be used without the use of a visual representation. In the examples described below two parties exchange and verify their public keys, so they can establish some trust relationship and securely communicate by encrypting and verifying messages. It will be appreciated, however, that there may be more than two parties involved and/or that the visual verification may be used to identify parties without any subsequent encrypted communications.

In the following description, VH(m) is defined as a visual hash representation of message m, which may be generated using the methods described above. In an example, a cryptographic hash function may first be applied to a clear text m (as in block 103 of FIG. 1) and then portions of the results assigned to different properties of the generated image (as in blocks 104-105). As described above, in other examples, a cryptographic hash may not be used and either the clear text m or another function of the clear text m may be used to generate the visual representation VH(m).

Figure 3:
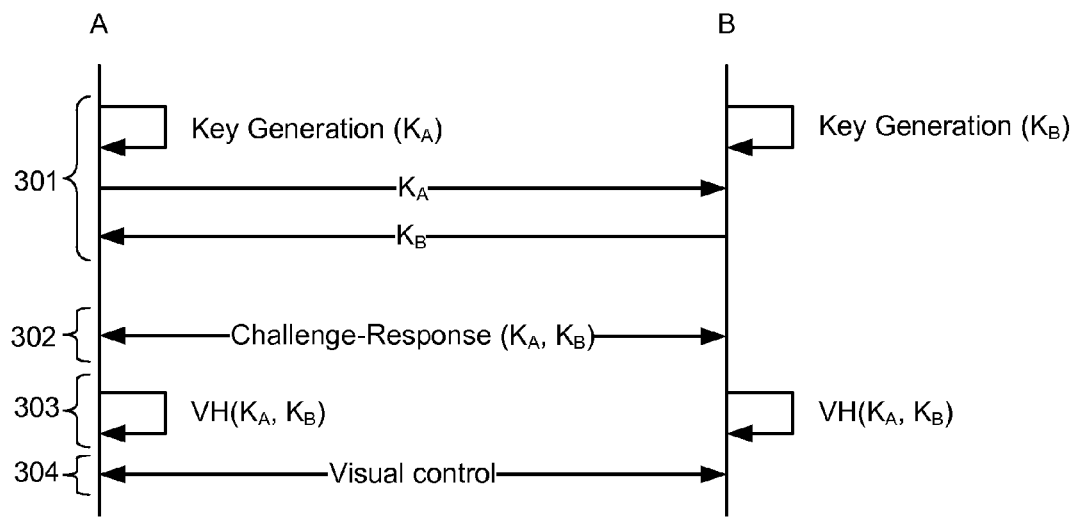
FIG. 3 shows a schematic diagram of a first protocol for secure ad-hoc trust establishment.

FIG. 3 shows a schematic diagram of a first protocol for secure ad-hoc trust establishment. According to this protocol, both users (denoted A and B in FIG. 3) generate and send their public keys (denoted $K_A$ and $K_B$) to each other (phase 301) and this is followed by an optional challenge-response phase 302 to ensure the integrity of the keys. The challenge-response phase 302 involves each user proving to the other user that they know the private key which corresponds to the public key which they have exchanged (in the key exchange phase 301). In an example, the challenge-response phase 302 may operate as follows:

User A encrypts a value (which may be a random number) with User B's public key ($K_B$) and sends the encrypted value to User B;

User B decodes the encrypted value using their private key and then sends the decrypted value and a value generated by User B (which again may be a random number) encrypted using the public key of User A($K_A$); and finally User A decrypts the received value using their private key and sends the value back to User B.

Each user then calculates one visual hash (VH($K_A$, $K_B$)) based on both (public) keys (phase 303) and the users verify the hash values through a comparison of the visual hashes (phase 304, e.g. as described above).

Figure 4:
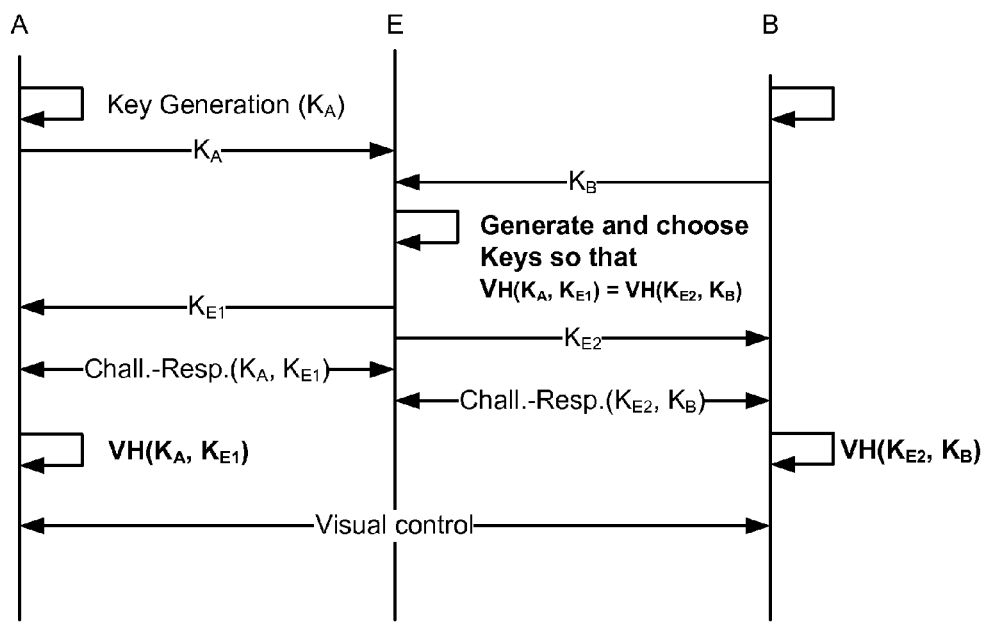
FIG. 4 is a schematic diagram depicting a man in the middle attack.

If the users successfully exchange the keys using the protocol shown in FIG. 3, User A knows that they are communicating with someone knowing the private key corresponding to the public key of User B and User B knows that they are communicating with someone knowing the private key corresponding to the public key of User A. Furthermore, an attacker cannot eavesdrop the communication (when using encryption) or compromise the communication without being detected (when signing the communication) later on. However, an attacker may be able to mount a man in the middle attack and replace the keys during the initialization phase without being noticed by legitimate participant to the protocol. Such a man in the middle attack is shown in FIG. 4, with the attacker being denoted E. In such an attack, the attacker communicates independently with each of the users (A and B) whilst the users believe that they are communicating directly with each other. In order to succeed with such an attack, the attacker has to find two key pairs $K_{E1}$, $K_{E2}$ so that the visual hash values computed by the users are the same, i.e. VH($K_A$, $K_{E1}$)=VH($K_{E2}$, $K_B$). Such an attack is referred to as a 'collision attack'.

The likelihood for such a successful collision attack greatly depends on the number of bits embedded in the visual hash and the time window for an attack. The complexity of the attack is SQRT(|VH|) e.g. if there are 32 bits in the visual hash, an attacker will need to try $2^{16}$ key pairs which is feasible even with a short time window. If each user generates a new key at the beginning of an ad-hoc key exchange (as in phase 301), the time window for an attack is significantly reduced and the security is increased. In addition, or instead, the possibility of such an attack may be reduced (and in some cases, such attacks may be prevented) by increasing the size of the visual hash value, e.g. from 64 bits to in excess of 128 bits. However, an attacker can succeed if they can break the visual hash and whilst the attack can be made harder by reducing the time window and/or increasing the size of the visual hash, such large visual hashes are not user-friendly.

Figure 5:
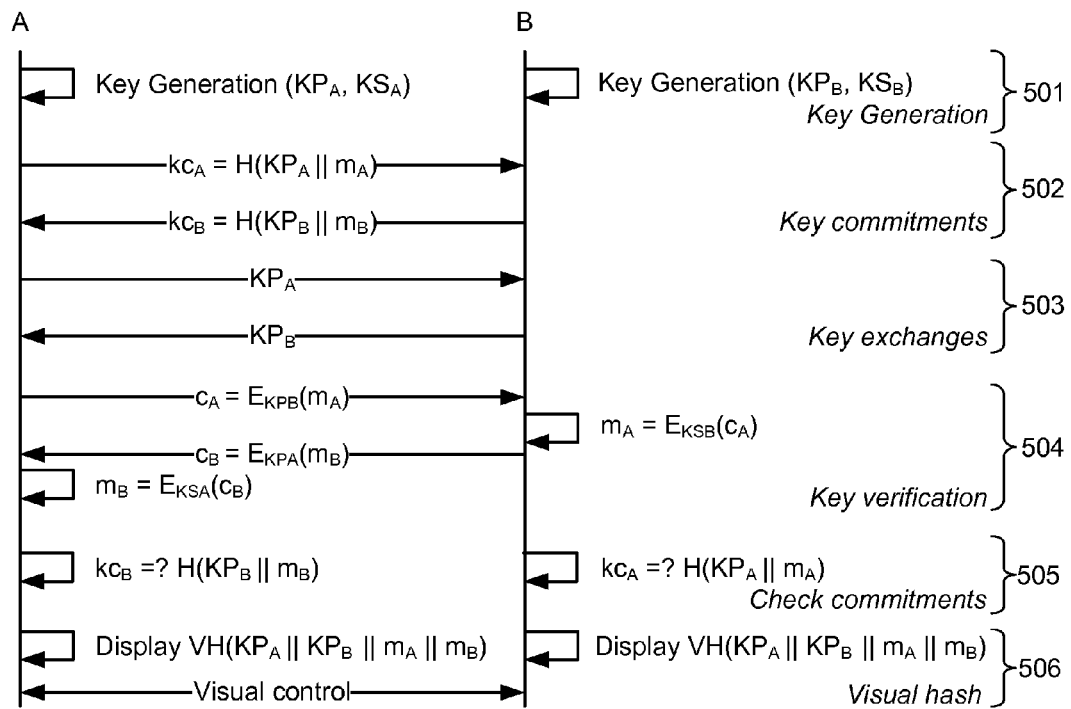
FIGS. 5 and 6 show schematic diagrams of further protocols for secure ad-hoc trust establishment.

FIG. 5 shows a schematic diagram of a more elaborate protocol for secure ad-hoc trust establishment in which the users (A and B) agree on the key before generating the visual hash. This protocol prevents a man in the middle attack, such as shown in FIG. 4, and therefore does not require use of large hash values (although such large values may be used).

In the protocol shown in FIG. 5, both parties generate a new key pair (key generation phase 501) where the key pair comprises a private key $KS_X$ and a public key $KP_X$ (where X is A or B, in these examples). Both parties then exchange commitment data ($kc_X$) which are linked to their keys without revealing the keys (key commitment phase 502). The commitment data can be subsequently verified and thus prevents replacement of one/both keys in the meantime. The data encapsulates the key in such a way that the key cannot be deduced from the data itself. In an example, the parties exchange the hash value of their public keys concatenated with a value $m_X$, i.e. $kc_X = H(KP_X \| m_X)$. This value $m_X$ may be referred to as a 'challenge' and may be a random value. This phase is referred to as the key commitment phase as after receiving this value, both parties have the ability to check later on the validity of the received public keys and neither party can change their key without this being detectable by the other party. Both parties then exchange their public keys $KP_X$ (key exchange phase 503). The public keys can be exchanged in clear text.

The challenge-response (or key verification) phase 504 is based on the previously exchanged random values. This phase makes sure that the correct parties are talking to each other. Each party sends a message $c_X$ to the other party, where the message comprises the previously used challenge $m_X$ encrypted using the received public key (e.g. $c_A = E_{KPB}(m_A)$). The receiving party uses its secret key ($KS_X$) to decrypt the other party's message and identify the other party's challenge $m_X$.

After the key verification phase 504 both parties know both challenges ($m_X$) and a party can therefore use the other party's challenge to check that the key received (in phase 503) corresponds to the hash value provided earlier (in the commitment phase 502). This phase is referred to as the commitment check phase 505 and both parties compute the hash of the received public key concatenated with the challenge of the other party and compare it with the initially received hash values received during the key commitment phase 502. If the received value and the computed value are different, then the other party is not the correct node and at this point the protocol stops (e.g. by raising an error message). If the computed hash value matches the previously received hash value, both parties compute the visual hash based on both public keys and challenges (e.g. $VH(KP_A \| KP_B \| m_A \| m_B)$), and display the visual hash on their device screen. The user can then verify the hash values through comparison of the visual hashes (visual hash phase 506). The visual hash verification may be performed as described above and in many cases involves direct communication between two users, for example face to face or via an audio link (e.g. over the telephone).

The key commitment phase 502 ensures that each party fixes a key to be used before exposing the actual key to the other party and potentially to any eavesdroppers. Verification of the cryptographic hash (in phase 505) does not involve the user and a standard hash size (e.g. 160 bits, 256 bits or more) can be used providing a high level of certainty that an attacker cannot replace the keys. A brute force man in the middle attack is therefore prevented by the key commitment phase 502.

Additionally, the commitment phase protects the devices against a proxy attack where a third party listens to the communication channel to get the exchanged keys and generates the same visual hash as the two legitimate devices. This protection is provided through the use of the secret challenge ($m_X$) in the key commitment phase. The challenges are exchanged between the parties in a way that does not enable any other device to see the values: asymmetric encryption is used such that only a party that knows the private key corresponding to the presented public key can decrypt the message and obtain the challenge ($m_X$). These challenges are also used in the computation of the visual hash to guarantee that only the parties' devices can generate the correct visual hash. To increase security further and prevent an attacker from deducing the challenge ($m_X$) from the public key and the commitment, the challenge ($m_X$) may comprise N bits, where N is at least, equal to the size of the hash value returned by the cryptographic hash function (e.g. 160).

Furthermore, where a man in the middle attack is launched, it would be detectable by both parties through the failure of the key verification phase (phase 504) and therefore the protocol can be aborted at this stage.

Since the commitment ensures that it is not possible for any attacker to replace the keys, the last phase of the protocol (which is the comparison of the visual representations) mainly needs to ensure that communication partner is the right one. Therefore, due to the key commitment phase and assuming that hash function H is a one-way function, the cost of an attack is independent of the number of bits (n) embedded in the picture and therefore it is not necessary to use a very large number of bits resulting in a very complex visual representation (as required by the protocol shown in FIG. 3). Instead a less complex visual representation may be used which encodes a smaller number of bits. The probability of a successful attack remains related to the number of bits n: $p = 2^{-n}$. For example, with 32 bits in the visual hash, the probability of a successful attack is $2^{-32}$ i.e. the protocol will fail four billion times for one successful attack. Commitment ensures that each unsuccessful attack will involve users and will thus be visible. As shown in FIG. 2, 32 bits can be encoded in a relatively simple picture.

Figure 6:
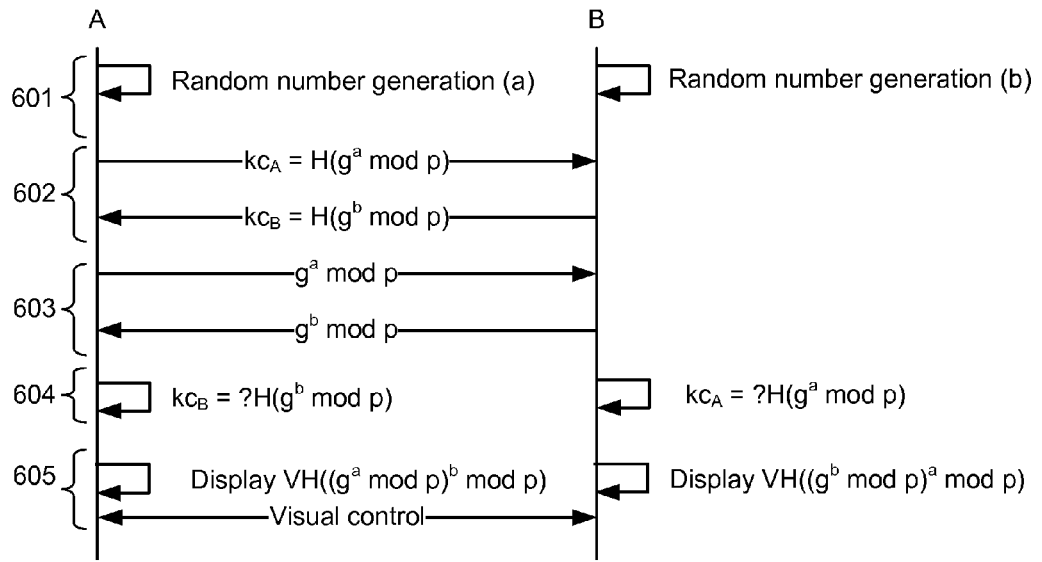

FIG. 6 shows a schematic diagram of another protocol for secure ad-hoc trust establishment. This protocol is similar to that shown in FIG. 5 but uses Diffie-Hellman key exchange rather than public-private keys. Diffie-Hellman key exchange uses a prime number, p, and a base, g, which are agreed between the parties. Both parties initially generate a random number (phase 601). These random numbers (a, b) may be considered to be analogous to the private keys of the parties. The commitment phase 602, in combination with the key verification phase 604, is used to make sure that an attacker (man in the middle) cannot compute the value of the parties' random numbers (a and b) based on the received values ($g^b$ mod p and $g^a$ mod p) in phase 603. These received values may be considered to be analogous to the public keys of the parties. If the values computed in the key verification phase 604 do not match the previously received values (from phase 602), then the protocol is aborted. In the final phase 605 the visual verification is performed. The visual hashes are generated from $(g^b \bmod p)^a \bmod p$ and $(g^a \bmod p)^b \bmod p$ respectively and should be the same. Alternatively, these values may be hashed before creating the visual hash (e.g. $VH(H((g^b \bmod p)^a \bmod p)))$. This protocol extends the standard Diffie-Hellman key exchange, which does not provide any form of authentication, by enabling devices to use the visual hash in order to verify that the correct devices are involved in the exchange.

Figure 7:
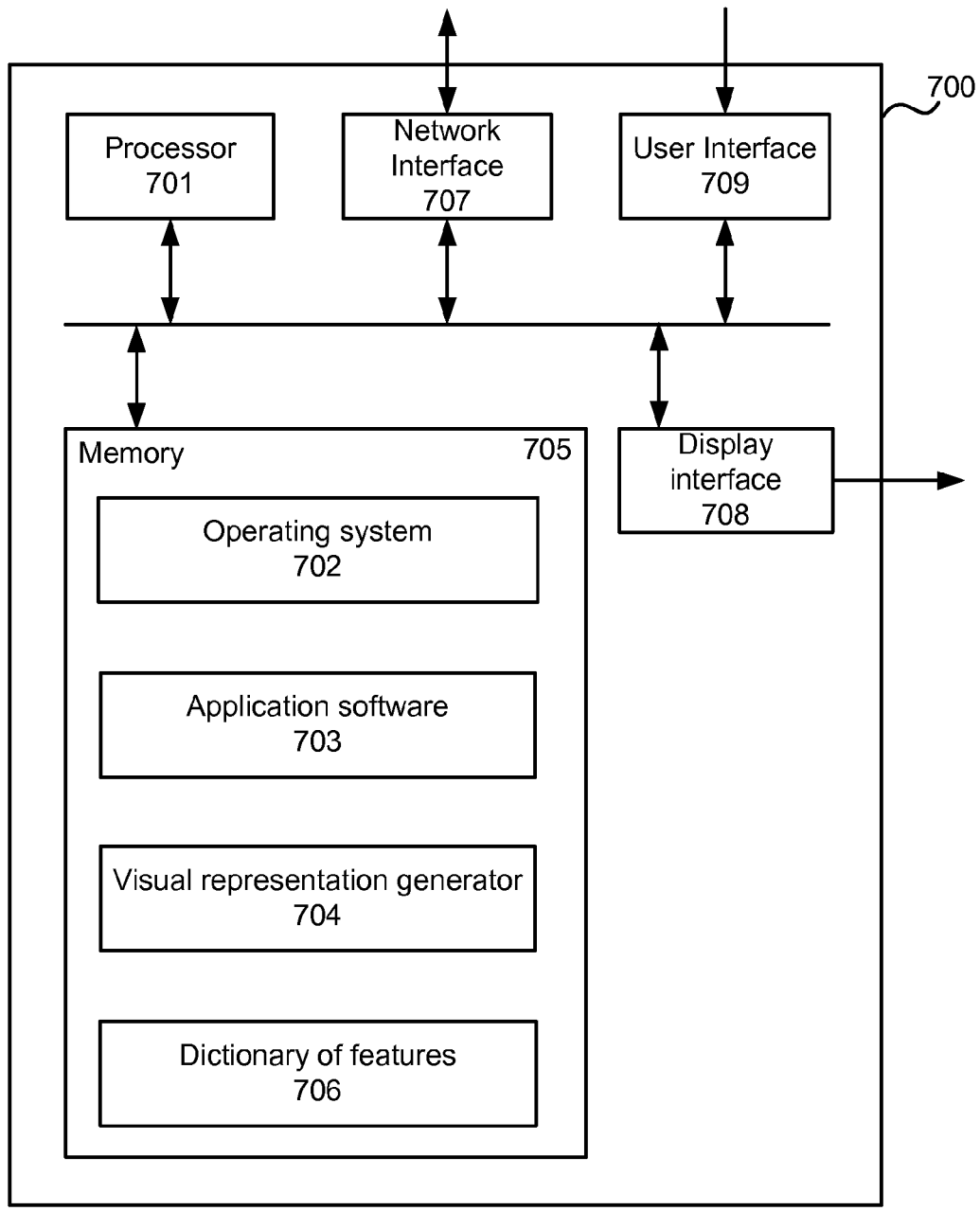
FIG. 7 illustrates an exemplary computing-based device in which embodiments of the methods described herein may be implemented.

FIG. 7 illustrates various components of an exemplary computing-based device 700 which may be implemented as any form of a computing and/or electronic device, and in which embodiments of the methods described above may be implemented. The device 700 comprises a device which is used to generate a visual representation and/or perform steps in a protocol for secure ad-hoc trust establishment. The device may, for example, be a user device (e.g. a mobile telephone, PDA, laptop computer) or a device with which a user interacts (e.g. a self-service terminal).

Computing-based device 700 comprises one or more processors 701 which may be microprocessors, controllers or any other suitable type of processors for processing computer executable instructions to control the operation of the device in order to generate visual representations of shared secrets and/or exchange and verify shared secrets as described above. Platform software comprising an operating system 702 or any other suitable platform software may be provided at the computing-based device to enable application software 703-704 to be executed on the device. The application software may comprise a visual representation generating module 704.

The computer executable instructions may be provided using any computer-readable media, such as memory 705. The memory is of any suitable type such as random access memory (RAM), a disk storage device of any type such as a magnetic or optical storage device, a hard disk drive, or a CD, DVD or other disc drive. Flash memory, EPROM or EEPROM may also be used. The memory may also be used to store a dictionary (which may also be referred to as a library) of features 706 which may be used in generating a visual representation of a shared secret.

The computing-based device 700 also comprises a network interface 707 for transmitting data to other devices (e.g. the messages shown in FIGS. 3-6) and a display interface 708 for displaying the visual representation of the shared secret. Where the representation of the shared secret is not visual, but audible, the device 700 may alternatively comprise a sound interface (and the visual representation generating module 704 may be replaced by an audible representation generating module). The device 700 may further comprise a user interface 709 for receiving user inputs via a user input device (e.g. keyboard, mouse, stylus, buttons etc).

There are many different applications for the methods and apparatus described above. The methods and apparatus may be used to prevent man in the middle attacks and may also be used to confirm that the party that a user is communicating with is the right party. One example, using Alice and Bob, is described above and further example applications are described below.

In the Alice and Bob example described above, a physical relationship between users Alice and Bob establishes trust between them and the methods described herein may be used to establish a trust relationship in the electronic domain such that they can securely share information between user devices.

In another example, however, a user may use the methods and apparatus described to verify a person or machine is the correct party. In a first example of this, a user Caroline attends a conference and wishes to meet with a representative of company D. When Caroline meets David who purports to be from company D, the methods described above may be used to compare visual representations which are generated based on a shared secret which is known by Caroline and by representatives of company D. If the visual representations generated by Caroline and David are the same, Caroline knows that David is a representative of company D, but if they do not match then Caroline knows that David is an imposter. In a second example of this, a user may use the techniques described herein when interacting with a self-service terminal, such as a vending machine. In such an example, the user can exchange messages (e.g. as shown in FIGS. 3 and 5-6) with a device and if the self-service terminal displays the same visual representation as that shown on the user's device, then the user knows that the device with which the user is communicating is the self-service terminal. This may be particularly useful where there are a number of different self-service terminals (e.g. ATMs or ticket machines) and through use of a wireless discovery protocol may discover and initiate communications with any one of the terminals. For example, to prevent the scenario where Bob may be standing in front of a dummy ATM but is actually communicating with another ATM where the money is delivered and collected by an attacker. Other means (such as signs on the terminals) may be used to prompt the user to select the correct device name to communicate with, but use of visual representations and the protocols described herein provides confirmation that the correct device name was selected and also that the communications have not been intercepted in a man in the middle attack.

Although the present examples are described and illustrated herein as being implemented in an ad-hoc system, the system described is provided as an example and not a limitation. As those skilled in the art will appreciate, the present examples are suitable for application in a variety of different types of systems and scenarios where trust is to be established between parties. There may be two or more parties involved and the parties may be human users and/or machines (e.g. Alice and Bob or Alice and a self-service terminal).

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer implemented method of establishing a trust relationship, the method operable on a processor, the method comprising:
   computing, by the processor, a hash value of the shared data;
   dividing a predetermined number of bits of the hash value into a plurality of unequal sized portions;
   mapping at least one of the plurality of portions to a graphical symbol and at least another one of the plurality of portions to a background color, wherein the portion mapped to the graphical symbol comprises a larger portion than the portion mapped to the background color; and
   combining the graphical symbol comprising the larger portion and the background color comprising the smaller portion to form a visual representation, wherein dividing the predetermined number of bits of the hash value into a plurality of unequal sized portions comprises:
   dividing the hash value into at least one 8 bit portion and at least one 3 bit portion, and
   wherein mapping at least one of the plurality of portions to a graphical symbol and at least another one of the plurality of portions to a background color comprises:
      mapping the at least one 8 bit portion of the hash value to the graphical symbol, and
      mapping the at least one 3 bit portion of the hash value to the background color.

2. A method according to claim 1, wherein each graphical symbol and background color is selected from a dictionary of visual features.

3. A method according to claim 1, further comprising generating data corresponding to a visual representation and sending the data to a user for comparison with a second visual representation of the shared data, wherein the comparison with the second visual representation comprises a comparison of the visual representation displayed on the display device with the second visual representation displayed on a display device of another device.

4. A method according to claim 1, further comprising, prior to generating a visual representation of shared data:
   generating at least a first key;
   transmitting a hash of at least the first key to a device and receiving a hash of at least a second key from the device;
   transmitting the first key to the device and receiving the second key from the device; and
   checking that the hash of at least the second key corresponds to the second key, and
   wherein the shared data comprises a combination of at least the first key and the second key.

5. A method of secure key exchange comprising:
   generating at least a first key at a first device;
   transmitting a hash of at least the first key to a second device and receiving a hash of at least a second key from the second device;
   transmitting the first key to the second device and receiving the second key from the second device;
   checking that the hash of at least the second key corresponds to the second key;
   generating a visual representation of at least the first key and the second key, the generating including:
      computing a hash of at least the first key and the second key;
      dividing a predetermined number of bits of the hash into a plurality of unequal sized portions;
      mapping at least one of said plurality of portions to a graphical symbol and mapping at least another one of said plurality of portions to a background color, wherein the portion mapped to the graphical symbol comprises a larger portion than the portion mapped to the background color;
      combining at least the graphical symbol comprising the larger portion and the background color comprising the smaller portion to form the visual representation;
      creating a combination of at least the first key, the second key, and at least one of the hash of at least the first key and the hash of at least the second key;
      mapping the combination of at least the first key, the second key, and at least one of the hash of at least the first key and the hash of at least the second key to a plurality of combined graphical symbols and backgrounds; and
      displaying the plurality of combined graphical symbols and backgrounds as the combined visual representation.

6. A method according to claim 5, wherein each graphical symbol and background color is selected from a dictionary of visual features.

7. A method according to claim 5, wherein the first key comprises a public key and wherein generating at least a first key comprises:
   generating a pair of keys comprising a public key and a private key.

8. A method according to claim 7, wherein the hash of at least the first key comprises a hash value of the first key and a first secret value and the hash of the at least second key comprises a hash value of the second key and a second secret value and wherein the method further comprises:

encrypting the first secret value using the second key to generate a first encrypted value;

transmitting the first encrypted value to the second device;

receiving a second encrypted value from the second device; and decrypting the second encrypted value using the private key to determine the second secret value.

9. A method according to claim 8, wherein generating a visual representation of at least the first key and the second key comprises:

generating a visual representation of the first and second keys and the first and second secret values.

10. One or more memory devices with device-executable instructions for performing steps comprising:

generating a first public key and a corresponding private key at a first device;

generating a first hash value from at least the first public key, the first hash value being generated from the first public key and a first value;

sending the first hash value to a second device and receiving a second hash value from the second device, the second hash value being generated from at least a second public key;

sending the first public key to the second device and receiving the second public key from the second device;

verifying that the second hash value corresponds to the second public key;

creating a combined visual representation generated from at least the first public key and the second public key, the creating including:

computing a hash of at least the first public key and the second public key;

dividing a predetermined number of bits of the hash into a plurality of unequal sized portions;

mapping at least one of said plurality of portions to a first graphical feature and mapping at least another one of said plurality of portions to a second feature different from the first feature, wherein the portion mapped to the first graphical feature comprises a larger portion than the portion mapped to the second feature; and combining at least the first feature comprising the larger portion and the second feature comprising the smaller portion to form the combined visual representation;

encrypting the first value using the second public key;

sending the encrypted first value to the second device;

receiving an encrypted second value from the second device; and decrypting the second encrypted value using the private key to identify a second value, the second value being used in verifying that the second hash value corresponds to the second key.

11. One or more memory devices according to claim 10, wherein verifying that the second hash value corresponds to the second public key comprises:

computing a hash value of the second public key and the second value; and comparing said computed hash value to said second hash value.

12. One or more memory devices according to claim 10, wherein the combined visual representation is generated from the first public key, the second public key and the first and second values.

13. One or more memory devices according to claim 10, wherein creating the combined visual representation generated from at least the first public key and the second public key further comprises:

creating a combination of at least the first public key, the second public key, and at least one of the first and second hash values;

mapping the combination of at least the first public key, the second public key, and at least one of the first and second hash values to a plurality of combined graphical symbols and backgrounds; and displaying the plurality of combined graphical symbols and backgrounds as the combined visual representation.

* * * * *